(12) United States Patent
Shibagami

(10) Patent No.: US 11,843,852 B2
(45) Date of Patent: *Dec. 12, 2023

(54) IMAGING APPARATUS FOR GENERATING IMAGE FROM FIRST IMAGE CORRESPONDING TO FIRST FIELD OF VIEW AND SECOND IMAGE CORRESPONDING TO SECOND FIELD OF VIEW

(71) Applicant: CANON KABUSHIKI KAISHA, Tokyo (JP)

(72) Inventor: Genjiro Shibagami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,317

(22) Filed: Jan. 27, 2023

(65) Prior Publication Data
US 2023/0171483 A1 Jun. 1, 2023

Related U.S. Application Data

(63) Continuation of application No. 17/152,004, filed on Jan. 19, 2021, now Pat. No. 11,595,563, which is a
(Continued)

(30) Foreign Application Priority Data

Jul. 26, 2018 (JP) ................................ 2018-140093

(51) Int. Cl.
*H04N 23/62* (2023.01)
*H04N 23/63* (2023.01)
(Continued)

(52) U.S. Cl.
CPC ............. *H04N 23/62* (2023.01); *H04N 23/63* (2023.01); *H04N 23/64* (2023.01); *H04N 23/698* (2023.01); *H04N 23/90* (2023.01)

(58) Field of Classification Search
CPC ........... H04N 5/23216; H04N 5/23222; H04N 5/23238; H04N 5/23293; H04N 5/247;
(Continued)

(56) References Cited

U.S. PATENT DOCUMENTS 9,300,867 B2  3/2016  Shibagami
9,560,274 B2  1/2017  Hirata
(Continued)

FOREIGN PATENT DOCUMENTS

JP  2003-101848 A  4/2003
JP  2011-205345 A  10/2011
(Continued)

OTHER PUBLICATIONS

Apr. 4, 2023 Japanese Official Action in Japanese Patent Appln. No. 2022-104402.
(Continued)

*Primary Examiner* — Christopher K Peterson
(74) *Attorney, Agent, or Firm* — Venable LLP

(57) ABSTRACT

An imaging apparatus according to the present invention includes a first camera and a second camera, and performing photography using the first camera and the second camera, and generating a composite image from a plurality of images acquired by the photography, the imaging apparatus comprising at least one memory and at least one processor which function as: an acquiring unit configured to acquire two images by performing a first photography and a second photography, which is performed after a time lag from the first photography; and a generating unit configured to generate a composite image having a visual field range of 360 degrees by compositing a first image acquired by performing photography for a first range in the first photography and a second image acquired by performing photography for a second range in the second photography.

36 Claims, 5 Drawing Sheets

Related U.S. Application Data continuation of application No. PCT/JP2019/028002, filed on Jul. 17, 2019.

(51) Int. Cl.
*H04N 23/60* (2023.01)
*H04N 23/90* (2023.01)
*H04N 23/698* (2023.01)

(58) Field of Classification Search
CPC .. H04N 5/2258; H04N 5/23245; H04N 5/225; G03B 15/00; G03B 17/18; G03B 37/00
See application file for complete search history.

(56) References Cited

U.S. PATENT DOCUMENTS

| | | | |
|---|---|---|---|
| 9,646,404 | B2 | 5/2017 | Irie |
| 10,404,912 | B2 | 9/2019 | Ogawa |
| 11,595,563 | B2* | 2/2023 | Shibagami ............. H04N 23/45 |
| 2003/0095193 | A1* | 5/2003 | May ..................... H04N 23/698 348/E5.053 |
| 2014/0240454 | A1 | 8/2014 | Hirata |
| 2015/0358546 | A1* | 12/2015 | Higashiyama ......... H04N 23/88 348/208.2 |
| 2016/0048992 | A1 | 2/2016 | Irie |
| 2016/0156844 | A1* | 6/2016 | Ogawa .................. G06T 3/4038 348/36 |
| 2017/0150051 | A1* | 5/2017 | Ito .......................... G03B 17/48 |
| 2018/0173404 | A1* | 6/2018 | Smith .................... G06F 3/017 |
| 2019/0206013 | A1* | 7/2019 | Okuyama ............. H04N 9/8042 |
| 2019/0340737 | A1* | 11/2019 | Kawaguchi .......... H04N 23/698 |

FOREIGN PATENT DOCUMENTS

| | | |
|---|---|---|
| JP | 2013-198062 A | 9/2013 |
| JP | 2015-176560 A | 10/2015 |
| JP | 2016-103806 A | 6/2016 |
| JP | 2017-152946 A | 8/2017 |
| JP | 2017-154419 A | 9/2017 |
| JP | 2017-220824 A | 12/2017 |
| JP | 2018-083310 A | 5/2018 |
| WO | 2013/069047 A1 | 5/2013 |
| WO | 2018/025825 A1 | 2/2018 |

OTHER PUBLICATIONS

Oct. 15, 2019 International Search Report in International Patent Appln. No. PCT/JP2019/028002.

* cited by examiner

IMAGING APPARATUS FOR GENERATING IMAGE FROM FIRST IMAGE CORRESPONDING TO FIRST FIELD OF VIEW AND SECOND IMAGE CORRESPONDING TO SECOND FIELD OF VIEW

CROSS-REFERENCE TO RELATED APPLICATIONS

This application is a continuation of application Ser. No. 17/152,004 filed Jan. 19, 2021, which is a Continuation of International Patent Application No. PCT/JP2019/028002, filed Jul. 17, 2019, which claims the benefit of Japanese Patent Application No. 2018-140093, filed Jul. 26, 2018, which is hereby incorporated by reference herein in its entirety.

BACKGROUND OF THE INVENTION

Field of the Invention

The present relates to an imaging apparatus.

Background Art

In recent years, imaging apparatuses capable of photographing an image having a range that is wider than a human viewing angle, such as an omnidirectional image or a fully celestial image, are widely used. Posting through social networking services on the Internet an image (for example, a fully celestial image) having been photographed by such an imaging apparatus to an unspecified number of people has become widespread practice.

When posting an image to an unspecified number of people, measures for privacy protection are desirably put in place as necessary to ensure that the image does not include information enabling an individual to be identified. However, since a fully celestial imaging apparatus (an imaging apparatus that photographs a fully celestial image) has virtually no blind spots, a photographer ends up appearing in a photographed fully celestial image. In addition, even in a case of non-fully celestial images, the same problem occurs in a wide-range image (an image having a wide range).

PTL 1 discloses performing anonymization processing (blurring or coloring in shade) on a photographer region. PTL 2 discloses determining whether or not an image of a supporting member (including a photographer) supporting an imaging apparatus is present within a predetermined range and, if so, filling the range with a predetermined texture.

However, when using the techniques described in PTL 1 and PTL 2, although the identity of a photographer can be made unrecognizable, a blurred region or a region fully filled with a predetermined color or texture or the like remains in the image.

The present invention provides an imaging apparatus capable of photographing a wide-range image in which a specific object, such as a photographer, does not appear and which does not elicit any unnatural feeling.

CITATION LIST

Patent Literature

PTL 1 Japanese Patent Laid-Open No. 2013-198062
PTL 2 Japanese Patent Laid-Open No. 2016-103806

SUMMARY OF THE INVENTION

The present invention in its first aspect provides an imaging apparatus including a first camera and a second camera, and performing photography using the first camera and the second camera, and generating a composite image from a plurality of images acquired by the photography, the imaging apparatus comprising at least one memory and at least one processor which function as:
  an acquiring unit configured to acquire two images by performing a first photography and a second photography, which is performed after a time lag from the first photography; and
  a generating unit configured to generate a composite image having a visual field range of 360 degrees by compositing a first image acquired by performing photography for a first range in the first photography and a second image acquired by performing photography for a second range in the second photography,
  wherein photography using the first camera is performed for a different direction from a direction for which photography using the second camera is performed, and
  the acquiring unit acquires the first image by performing photography using the first camera and acquires the second image by performing photography using the second camera.

The present invention in its second aspect provides a control method of an imaging apparatus including a first camera and a second camera, and performing photography using the first camera and the second camera, and generating a composite image from a plurality of images acquired by the photography, the control method comprising:
  acquiring two images by performing a first photography and a second photography, which is performed after a time lag from the first photography; and
  generating a composite image having a visual field range of 360 degrees by compositing a first image acquired by performing photography for a first range in the first photography and a second image acquired by performing photography for a second range in the second photography
  wherein photography using the first camera is performed for a different direction from a direction for which photography using the second camera is performed,
  the first image is acquired by performing photography using the first camera, and
  the second image is acquired by performing photography using the second camera.

The present invention in its third aspect provides a non-transitory computer readable medium that stores a program, wherein
  the program causes a computer to execute a control method of an imaging apparatus including a first camera and a second camera, and performing photography using the first camera and the second camera, and generating a composite image from a plurality of images acquired by the photography, the control method comprising:
  acquiring two images by performing a first photography and a second photography, which is performed after a time lag from the first photography; and
  generating a composite image having a visual field range of 360 degrees by compositing a first image acquired by performing photography for a first range in the first photography and a second image acquired by performing photography for a second range in the second photography wherein photography using the first camera is performed for a different direction from a direction for which photography using the second camera is performed, the first image is acquired by performing photography using the first camera, and the second image is acquired by performing photography using the second camera.

Further features of the present invention will become apparent from the following description of exemplary embodiments with reference to the attached drawings.

DESCRIPTION OF THE EMBODIMENTS

Figure 1A:
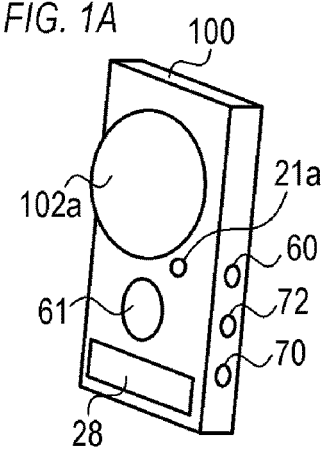
FIGS. 1A and 1B are external views of a digital camera.
Figure 1B:
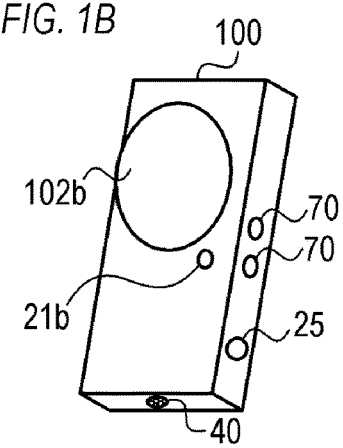

Hereinafter, preferred embodiments of the present invention will be described with reference to the drawings. FIG. 1A is a front perspective view (an external view) of a digital camera 100 (an imaging apparatus). FIG. 1B is a rear perspective view (an external view) of the digital camera 100. The digital camera 100 is a camera (an omnidirectional camera; a fully celestial camera) for photographing an omnidirectional image (a fully celestial image).

A barrier 102a is a protective window for a front camera unit having the front of the digital camera 100 as a photography range. The front camera unit is a wide-angle camera unit having, for example, a wide range of at least 180 vertical and horizontal angles on a front side of the digital camera 100 as a photography range. A barrier 102b is a protective window for a rear camera unit having the rear of the digital camera 100 as a photography range. The rear camera unit is a wide-angle camera unit having, for example, a wide range of at least 180 vertical and horizontal angles on a rear side of the digital camera 100 as a photography range.

A display unit 28 displays images and various types of information. A shutter button 61 is an operating unit (an operating member) for issuing a photography instruction. A mode selecting switch 60 is an operating unit for switching among various modes. A connecting I/F 25 is a connector for connecting a connecting cable to the digital camera 100 and, using the connecting cable, external apparatuses such as a smartphone, a personal computer, a television apparatus, and the like are connected to the digital camera 100. An operating unit 70 refers to various switches, buttons, dials, touch sensors, or the like for receiving various types of operations from a user. A power supply switch 72 is a push button for switching a power supply on and off. The user can also operate the digital camera 100 by using a wirelessly-connected external apparatus as a remote controller.

Light-emitting units (light-emitting members) 21a and 21b are light-emitting diodes (LEDs) or the like and notify the user of various states of the digital camera 100 through light emission patterns, light emission colors, or the like. The light-emitting unit 21a is provided on a front surface of the digital camera 100 and the light-emitting unit 21b is provided on a rear surface of the digital camera 100. A fixing portion 40 is, for example, a tripod screw hole that is used to fix and install the digital camera 100 with a fixing tool such as a tripod.

Figure 1C:
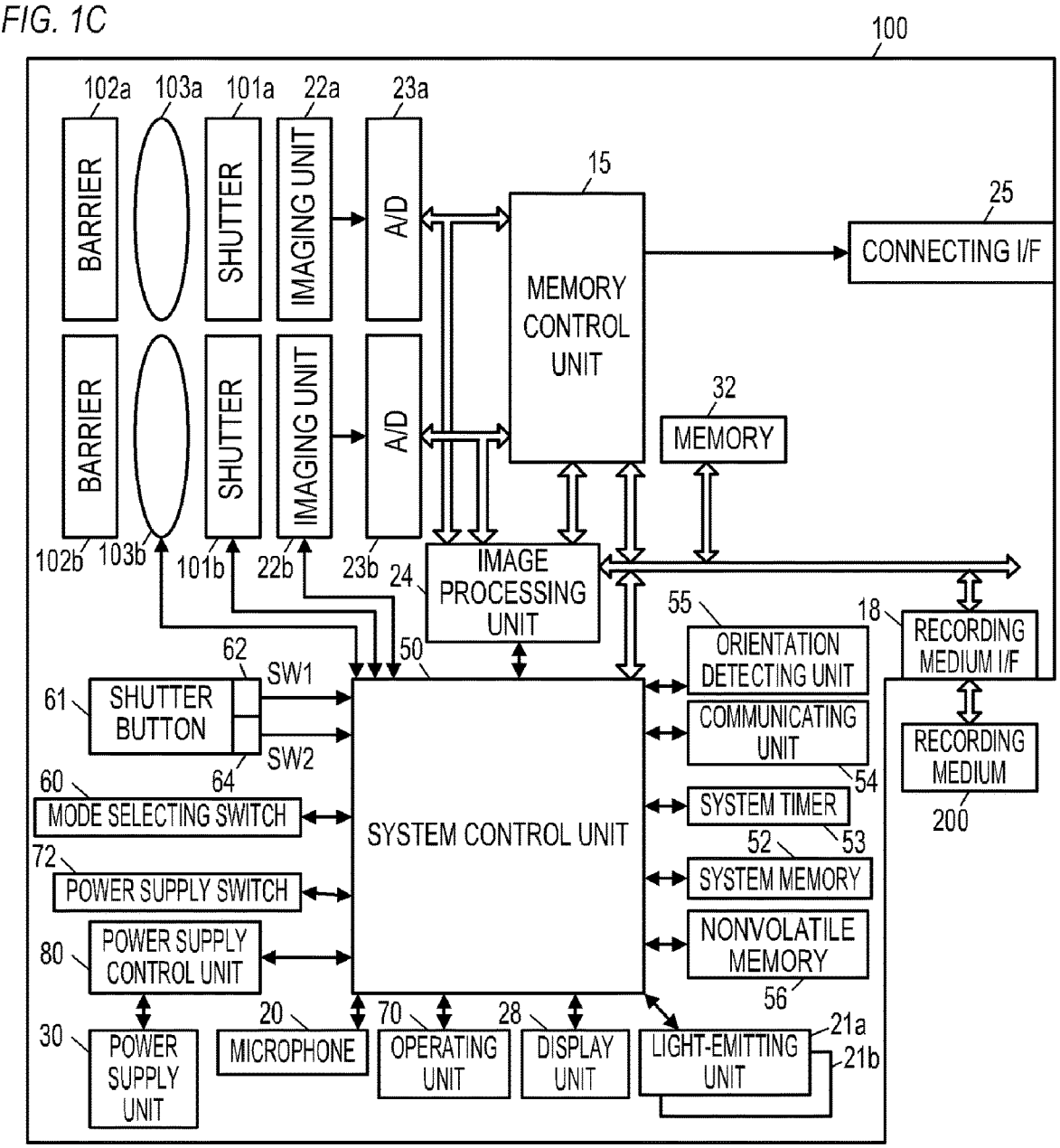
FIG. 1C is a block diagram of the digital camera.

FIG. 1C is a block diagram showing a configuration example of the digital camera 100.

The barrier 102a covers an imaging system (a photographic lens 103a, a shutter 101a, an imaging unit 22a, and the like) of the front camera unit to prevent the imaging system from becoming stained or damaged. The photographic lens 103a refers to a lens group including a zoom lens and a focusing lens and is a wide-angle lens. The shutter 101a is a shutter having a diaphragm function for adjusting an amount of incidence of object light into the imaging unit 22a. The imaging unit 22a is an imaging element constituted by a device such as a CCD or a CMOS which converts an optical image into an electrical signal. An A/D converter 23a converts an analog signal output from the imaging unit 22a into a digital signal. Alternatively, an external surface of the photographic lens 103a may be exposed and other parts of the imaging system (the shutter 101a and the imaging unit 22a) may be prevented from becoming stained or damaged by the photographic lens 103a without providing the barrier 102a.

The barrier 102b covers an imaging system (a photographic lens 103b, a shutter 101b, an imaging unit 22b, and the like) of the rear camera unit to prevent the imaging system from becoming stained or damaged. The photographic lens 103b refers to a lens group including a zoom lens and a focusing lens and is a wide-angle lens. The shutter 101b is a shutter having a diaphragm function for adjusting an amount of incidence of object light into the imaging unit 22b. The imaging unit 22b is an imaging element constituted by a device such as a CCD or a CMOS which converts an optical image into an electrical signal. An A/D converter 23b converts an analog signal output from the imaging unit 22b into a digital signal. Alternatively, an external surface of the photographic lens 103b may be exposed and other parts of the imaging system (the shutter 101b and the imaging unit 22b) may be prevented from becoming stained or damaged by the photographic lens 103b without providing the barrier 102b.

A virtual reality (VR) image is picked up by the imaging unit 22a and the imaging unit 22b. A VR image is assumed to be an image of which VR display can be performed. VR images are assumed to include an omnidirectional image (a fully celestial image) picked up by an omnidirectional camera (a fully celestial camera) and a panoramic image having a wider video range (a wider valid video range) than a display range that can be displayed at one time on the display unit. VR images include moving images and live view images (images acquired approximately in real time from a camera) in addition to still images. A VR image has a maximum video range (a maximum valid video range) corresponding to a visual field of 360 degrees in an up-down direction (a vertical angle, an angle from a zenith, an elevation, a depression angle, or an elevation angle) and 360 degrees in a left-right direction (a horizontal angle or an azimuth).

In addition, it is assumed that VR images include images with a wider angle of view (a wider visual field range) than an angle of view that can be photographed by an ordinary camera or images with a wider video range (a wider valid video range) than a display range that can be displayed at one time on the display unit even when the visual field of the images is less than 360 degrees in the vertical direction and less than 360 degrees in the horizontal direction. For example, an image photographed by a fully celestial camera capable of photographing an object corresponding to a visual field (an angle of view) of 360 degrees in the left-right direction (a horizontal angle or an azimuth) and 210 vertical degrees centered on a zenith is a type of a VR image. In addition, for example, an image photographed by a camera capable of photographing an object corresponding to a visual field (an angle of view) of 180 degrees or more in the left-right direction (a horizontal angle or an azimuth) and 180 vertical degrees centered on the horizontal direction is a type of a VR image. In other words, an image having a video range corresponding to a field of view of at least 160 degrees (±80 degrees) in both the vertical direction and the horizontal direction and having a video range that is wider than a range that can be visually recognized at one time by a human being is a type of a VR image.

By performing VR display (display in the "VR view" display mode) of the VR image, changing an orientation of a display apparatus (a display apparatus for displaying the VR image) in a horizontal rotation direction enables an omnidirectional video without any seams in the horizontal direction (the horizontal rotation direction) to be viewed. In the vertical direction (a vertical rotation direction), although an omnidirectional video without any seams can be viewed in a range of ±105 degrees with respect to directly above (the zenith), a range exceeding 105 degrees from directly above constitutes a blank region in which a video is not present. A VR image can also be described as "an image of which a video range is at least a part of a virtual space (a VR space)".

VR display (a VR view) refers to a display method (a display mode) of displaying a video of a partial visual field range (display range; display region) in accordance with an orientation of the display apparatus among a VR image and in which a display range can be changed. When wearing and viewing a head mounted display (HMD) that is a display apparatus, a video of a visual field range in accordance with an orientation of the head of the user is to be displayed. For example, let us assume that a video with a viewing angle (an angle of view) centered on 0 degrees in the left-right direction (a specific orientation such as north) and 90 degrees in the up-down direction (90 degrees from the zenith or, in other words, horizontal) at a certain point in time among a VR image is being displayed. When front and back of the orientation of the display apparatus is reversed from this state (for example, when a direction that a display surface faces is changed from south to north), the display range is changed to a video with a viewing angle centered on 180 degrees in the horizontal direction (an opposite orientation such as south) and 90 degrees in the vertical direction (horizontal) among the same VR image. This means that, in a case where the user is viewing the HMD, when the user turns his or her head from north to south (in other words, when the user turns around), the video displayed on the HMD also changes from a video of the north to a video of the south. Such a VR display enables the user to be provided with a sensation as though the user is visually present inside the VR image (inside the VR space). A smartphone mounted to VR goggles (a head mount adapter) can be considered a type of HMD.

It should be noted that a display method of a VR image is not limited to the method described above. A configuration may be adopted in which a display range is moved (scrolled) in accordance with a user operation with respect to a touch panel, a directional button, or the like instead of an orientation change. A configuration may be adopted in which, during VR display (during the VR view mode), both processing for changing the display range in accordance with an orientation change and processing for changing the display range in accordance with a touch-move operation with respect to the touch panel or a drag operation with respect to an operation member such as a mouse may be performed.

An image processing unit 24 performs predetermined processing (pixel interpolation, resizing processing such as reduction, color conversion processing, and the like) with respect to data from the A/D converter 23*a* or the A/D converter 23*b* or data from a memory control unit 15. In addition, the image processing unit 24 performs predetermined arithmetic processing using image data of a picked-up image. A system control unit 50 performs exposure control and ranging control on the basis of a computation result obtained by the image processing unit 24. Accordingly, processing steps such as automatic focus (AF) processing, automatic exposure (AE) processing, and preliminary light emission before flash (EF) processing in a through-the-lens (TTL) system are performed. The image processing unit 24 further performs predetermined arithmetic processing using image data of a picked-up image and performs automatic white balance (AWB) processing in the TTL system on the basis of an obtained computation result. In addition, the image processing unit 24 performs basic image processing on two images (fisheye images) obtained from the A/D converter 23*a* and the A/D converter 23*b*, and performs an image connection processing of compositing the two images having been subjected to the basic image processing to generate a single VR image. Furthermore, the image processing unit 24 performs image clipping processing, expansion processing, distortion correction, or the like for realizing VR display of the VR image during VR display in a live view or during reproduction, and performs rendering in which a processing result is rendered in a predetermined storage area of a memory 32.

In the image connection processing, the image processing unit 24 uses one of the two images as a reference image and the other as a comparison image, calculates an amount of deviation between the reference image and the comparison image for each area by pattern matching processing, and detects a connection position where the two images are to be connected on the basis of the amount of deviation for each area. In addition, the image processing unit 24 corrects distortion of each image by geometric conversion in consideration of the detected connection position and lens characteristics of each optical system. Accordingly, each image is converted into an image in a fully celestial format. In addition, by compositing (blending) the two images in the fully celestial format, the image processing unit 24 generates a single fully celestial image (a single VR image). The generated fully celestial image is an image using, for example, equirectangular projection, and a position of each pixel in the fully celestial image can be associated with coordinates on a surface of a sphere (a VR space).

Output data from the A/D converters 23*a* and 23*b* is written into the memory 32 via the image processing unit 24 and the memory control unit 15 or via the memory control unit 15. The memory 32 stores image data obtained by the imaging units 22*a* and 22*b* and converted into digital data by the A/D converters 23*a* and 23*b* and image data to be output to an external display apparatus from the connecting I/F 25. The memory 32 has sufficient storage capacity for storing a predetermined number of still images and a predetermined time's worth of moving images and audio.

In addition, the memory 32 also doubles as a memory (a video memory) for image display. Data for image display stored in the memory 32 can be output to an external display apparatus from the connecting I/F 25. By sequentially transferring VR images picked up by the imaging units 22a and 22b, generated by the image processing unit 24, and accumulated in the memory 32 to the external display apparatus and displaying the VR images on the external display apparatus, a function as an electronic view finder can be realized and live view display (LV display) can be realized. Hereinafter, an image displayed in live view display will be referred to as a live view image (LV image). In a similar manner, live view display (remote LV display) can also be realized by sequentially transferring VR images accumulated in the memory 32 to an external apparatus (a smartphone or the like) being wirelessly connected via a communicating unit 54 and having the external apparatus display the VR images.

A nonvolatile memory 56 is a memory as an electrically erasable and recordable recording medium and is, for example, an EEPROM. Constants, a program, and the like necessary for operations of the system control unit 50 are recorded in the nonvolatile memory 56. In this case, the program refers to a computer program for executing flow charts of the respective embodiments to be described later.

The system control unit 50 is a control unit constituted by at least one processor or one circuit and controls the entire digital camera 100. The system control unit 50 realizes processing of the respective embodiments (to be described later) by executing the program recorded in the nonvolatile memory 56 described earlier. A system memory 52 is, for example, a RAM, and the system control unit 50 deploys constants and variables for the operations of the system control unit 50, the program read from the nonvolatile memory 56, and the like onto the system memory 52. In addition, the system control unit 50 also performs display control by controlling the memory 32, the image processing unit 24, the memory control unit 15, and the like. A system timer 53 is a time-measuring unit for measuring time used in various controls and measuring time according to an internal clock.

The mode selecting switch 60, the shutter button 61, the operating unit 70, and the power supply switch 72 are used in order to input various operation instructions to the system control unit 50.

The mode selecting switch 60 switches an operating mode of the system control unit 50 to any of a still image recording mode, a moving image photography mode, a reproduction mode, a communication connection mode, photographer removal mode 1, photographer removal mode 2, and the like. Modes included in the still image recording mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode selecting switch 60, the user can directly switch to any of these modes. Alternatively, after temporarily switching to a photography mode list screen using the mode selecting switch 60, another operating member may be used to selectively switch to any of a plurality of modes being displayed on the display unit 28. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of automatic focus (AF) processing, automatic exposure (AE) processing, automatic white balance (AWB) processing, preliminary light emission before flash (EF) processing, and the like. A second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the imaging units 22a and 22b to writing image data into a recording medium 200.

It should be noted that the shutter button 61 is not limited to an operation member capable of operations in the two stages of a full depression and a half depression and may be an operation member only capable of a one-stage depression. In this case, a photography preparation operation and photography processing are successively performed by the one-stage depression. This is a same operation as a case where a shutter button that can be fully depressed and half-depressed is fully depressed (a case where the first shutter switch signal SW1 and the second shutter switch signal SW2 are generated approximately simultaneously).

By selecting and operating various function icons and options displayed on the display unit 28, the operating unit 70 is appropriately assigned a function for each scene and acts as various function buttons. Examples of function buttons include an end button, a return button, an image feed button, a jump button, a narrow-down button, an attribute change button, and an INFO button. For example, when a menu button is pushed, a menu screen enabling various settings to be configured is displayed on the display unit 28. The user can intuitively configure various settings by operating the operating unit 70 while looking at the menu screen displayed on the display unit 28.

The power supply switch 72 is a push button for switching a power supply on and off. A power supply control unit 80 is constituted by a battery detection circuit, a DC-DC converter, a switching circuit for switching between blocks to be energized, and the like, and detects whether or not a battery is mounted, a type of the battery, and a remaining battery level. In addition, the power supply control unit 80 controls the DC-DC converter on the basis of the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, an optical disk, a magnetic disk, or the like. The recording medium 200 may be a replaceable recording medium that is mountable to and dismountable from the digital camera 100 or a recording medium that is built into the digital camera 100.

The communicating unit 54 transmits and receives video signals, audio signals, and the like to and from an external apparatus connected wirelessly or by a wired cable. The communicating unit 54 is also capable of connecting to a wireless local area network (LAN) or the Internet and can also communicate via a network with an external apparatus (a server or the like) on the network. In addition, the communicating unit 54 is also capable of communicating with an external apparatus via Bluetooth (registered trademark) or Bluetooth Low Energy. The communicating unit 54 is capable of transmitting images (including LV images) picked up by the imaging units 22a and 22b and images recorded on the recording medium 200 as well as receiving images and various other types of information from an external apparatus.

An orientation detecting unit 55 detects an orientation of the digital camera 100 relative to a direction of gravitational force. On the basis of the orientation detected by the orientation detecting unit 55, a determination can be made as to whether an image photographed by the imaging units 22a and 22b is an image photographed while holding the digital camera 100 horizontally or an image photographed while holding the digital camera 100 vertically. In addition, a determination can be made as to how much the digital camera 100 had been tilted in rotation directions including a yaw direction, a pitch direction, and a roll direction during photography of an image by the imaging units 22a and 22b, and a tilt amount thereof can also be determined. The system control unit 50 can add orientation information in accordance with the orientation detected by the orientation detecting unit 55 to an image file of a VR image picked up by the imaging units 22a and 22b and record the VR image after rotating the image (after adjusting an orientation of the image so as to perform tilt correction). As the orientation detecting unit 55, an at least one combination of a plurality of sensors including an acceleration sensor, a gyro sensor, a geomagnetic sensor, an orientation sensor, an altitude sensor, and the like can be used. A motion (panning, tilting, uplifting, whether stationary or not, or the like) of the digital camera 100 can also be detected using the acceleration sensor, the gyro sensor, the orientation sensor, or the like that constitutes the orientation detecting unit 55.

A microphone 20 collects audio around the digital camera 100 to be recorded as audio of a VR image (a VR moving image) that is a moving image. The connecting I/F 25 is a connecting plug to which is connected an HDMI (registered trademark) cable, a USB cable, or the like to be connected to an external apparatus in order to transmit and receive video.

First Embodiment

Figure 2:
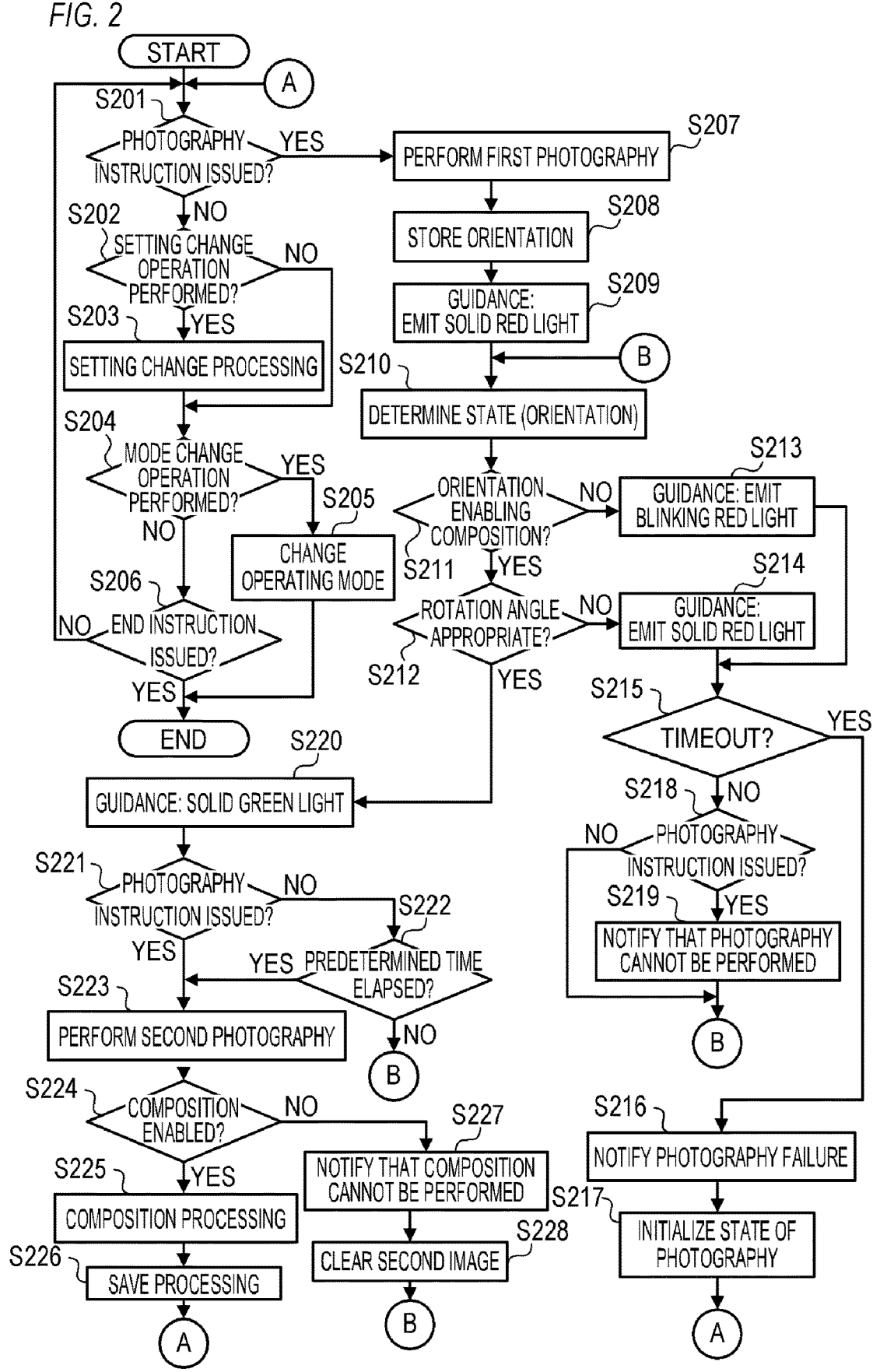
FIG. 2 is a flow chart of photographer removal mode 1.

A first embodiment of the present invention will be described. FIG. 2 is a flow chart according to the first embodiment and is a flow chart regarding photography processing of a fully celestial image performed by the digital camera 100. The processing is realized as the system control unit 50 deploys a program recorded in the nonvolatile memory 56 onto the system memory 52 and executes the program. The processing shown in FIG. 2 starts when power of the digital camera 100 is turned on and the photographer removal mode 1 is selected by an operation of the mode selecting switch 60.

In step S201, the system control unit 50 determines whether or not a photography instruction (a full-press on the shutter button 61) has been issued. When it is determined that a photography instruction has been issued, the processing advances to step S207, but otherwise the processing advances to step S202. In step S202, the system control unit 50 determines whether or not an operation for changing settings (a setting change operation) has been performed. For example, a determination is made as to whether or not an operation for changing the AF system, the AE system, the white balance system, or the like has been performed. When it is determined that a setting change operation has been performed, the processing advances to step S203, but otherwise the processing advances to step S204. In step S203, the system control unit 50 changes settings by reflecting a setting in accordance with the setting change operation onto the system memory 52 (setting change processing). In step S204, the system control unit 50 determines whether or not an operation for changing operating modes (a mode change operation; an operation of the mode selecting switch 60) has been performed. When it is determined that a mode change operation has been performed, the processing advances to step S205, but otherwise the processing advances to step S206. In step S205, the system control unit 50 changes operating modes from photographer removal mode 1 to another operating mode in accordance with the mode change operation. Subsequently, the processing shown in FIG. 2 is ended. In step S206, the system control unit 50 determines whether or not an end operation such as depressing the power supply switch 72 has been performed. When it is determined that an end operation has been performed, the processing shown in FIG. 2 is ended, but otherwise the processing returns to step S201.

In the present embodiment, two fully celestial images are obtained by two times of photography and the fully celestial images are composited. For example, in each photography, a fully celestial image in which a specific object such as a photographer appears is obtained. It should be noted that the number of times of photography, the number of photographed images (images obtained by photography), and the like are not particularly limited. More than two times of photography may be performed and more than two photographed images may be obtained. In addition, the photographed image may be a wide-range image (an image with a wide range; a VR image) other than a fully celestial image. For example, the photographed image may have a visual field range of 360 degrees around a predetermined axis and a visual field range of less than 360 degrees around another axis. An example of the predetermined axis is a yaw axis (a vertical axis).

When it is determined in step S201 that a photography instruction has been issued, in step S207, the system control unit 50 photographs a first fully celestial image and saves (records) the fully celestial image in the memory 32.

In step S208, the system control unit 50 detects an orientation of the digital camera 100 at the time of photography of the first fully celestial image using the orientation detecting unit 55 and records information (orientation information) on the orientation in the system memory 52.

In step S209, the system control unit 50 performs control so that a notification for assisting the plurality of (two) times of photography is performed (notification control). Specifically, the system control unit 50 causes the light-emitting unit 21a to emit light in any of a plurality of light emission patterns set in advance.

In the present embodiment, the system control unit 50 determines any of states 1 to 3 below as a present state.

State 1: a state where the photographer has not moved from a standing position at which the photographer had photographed the first fully celestial image to an opposite side of the digital camera 100

State 2: a state where an orientation assumed by the digital camera 100 is not suitable for composition State 3: a state where the photographer has moved from a standing position at which the photographer had photographed the first fully celestial image to the opposite side of the digital camera 100 and, at the same time, a state where an orientation assumed by the digital camera 100 is suitable for composition In addition, in the case of state 1, the system control unit 50 causes the light-emitting unit 21a to emit light in a first light emission pattern. Light emission in the first light emission pattern is, for example, solid red light. In the case of state 2, the system control unit 50 causes the light-emitting unit 21a to emit light in a second light emission pattern. Light emission in the second light emission pattern is, for example, blinking red light. In the case of state 3, the system control unit 50 causes the light-emitting unit 21a to emit light in a third light emission pattern. Light emission in the third light emission pattern is, for example, solid green light. Light emission patterns are not particularly limited as long as states 1 to 3 can be distinguished from one another.

Accordingly, the user is notified of the orientation of the digital camera 100 so that a plurality of times of photography can be performed in a suitable manner (orientation guidance).

States 1 to 3 will be described with reference to FIGS. 4 and 5A. For example, after photographing a first fully celestial image at a position P1 in FIG. 5A, the photographer moves from the position P1 to a position P2. At this point, the photographer rotates the digital camera 100 only in the yaw direction shown in FIG. 4 and changes a state (an orientation) of the digital camera 100 to a state of being rotated by 180 degrees in the yaw direction with respect to a state at the time of the first photography. In this state, the photographer at the position P2 photographs a second fully celestial image.

In the first fully celestial image, while the photographer does not appear in a region (visual field range) 501, the photographer appears in a region (visual field range) 502 that is outside of the region 501. In the second fully celestial image, while the photographer does not appear in the region 502, the photographer appears in the region 501. The system control unit 50 performs at least processing for compositing the region 501 of the first fully celestial image and the region 502 of the second fully celestial image with each other, thereby generating a fully celestial image, in which the photographer does not appear, as a composite image. In this manner, in the present invention, a fully celestial image in which a specific object such as a photographer does not appear and which is free of any sense of discomfort can be obtained (photographed). It should be added that the composite image may be a wide-range image (an image with a wide range; a VR image) other than a fully celestial image. For example, the composite image may have a visual field range of 360 degrees around a predetermined axis (such as a yaw axis) and a visual field range of less than 360 degrees around another axis. In the present embodiment, each of the regions 501 and 502 is a region set in advance. Alternatively, the regions 501 and 502 may be changed as appropriate by the digital camera 100.

Figure 4:
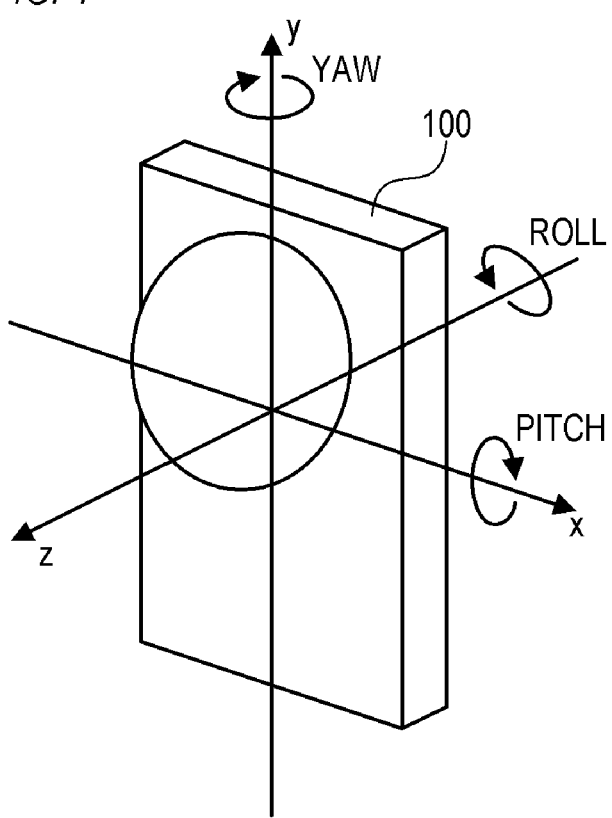
FIG. 4 is a diagram showing a movement direction a digital camera.

When the digital camera 100 moves by an at least predetermined amount in a direction other than the yaw direction or, in other words, an x direction, a y direction, a z direction, a roll direction, a pitch direction, or the like shown in FIG. 4 between the first photography and the second photography, the two fully celestial images cannot be suitably composited. In addition, when the rotation in the yaw direction is small, a fully celestial image in which the photographer does not appear in the region 502 cannot be photographed. Rotating the digital camera 100 in the yaw direction by around 180 degrees enables a fully celestial image in which the photographer does not appear in the region 502 to be photographed.

Therefore, states 1 to 3 described above can also be considered states 1' to 3' below.

State 1': a state where the digital camera 100 has not moved by an at least predetermined amount in a direction other than the yaw direction but a rotation angle in the yaw direction is not around 180 degrees State 2': a state where the digital camera 100 has moved by an at least predetermined amount in a direction other than the yaw direction State 3': a state where the digital camera 100 has not moved by an at least predetermined amount in a direction other than the yaw direction and, at the same time, a rotation angle in the yaw direction is around 180 degrees In addition, by differentiating notifications (light emission patterns of the light-emitting unit 21a) among states 1' to 3', a notification can be made as to whether or not the orientation of the digital camera 100 has been suitably changed after the first photography so that the photographer does not appear in the region 502.

A state of step S209 (immediately after the first photography) is state 1 (state 1'). Therefore, in step S209, the system control unit 50 performs processing for causing the light-emitting unit 21a to emit solid red light as the processing of orientation guidance.

In step S210, the system control unit 50 determines which of states 1 to 3 (states 1' to 3') represents the present state (state determination; orientation determination). Specifically, the system control unit 50 detects (acquires) orientation information of the digital camera 100 using the orientation detecting unit 55. In addition, based on the present orientation information and orientation information recorded in step S208 (orientation information at the time of the first photography), the system control unit 50 determines which of states 1 to 3 (states 1' to 3') represents the present state.

In step S211, based on the determination result of step S210, the system control unit 50 determines whether or not the present orientation of the digital camera 100 is an orientation that enables composition. The determination of whether or not the orientation enables composition is a determination of whether or not the orientation is suitable for composition which is a determination of whether or not the orientation results from not moving by an at least predetermined amount in a direction other than the yaw direction. When it is determined that the orientation enables composition, the processing advances to step S212, but otherwise the processing advances to step S213.

In step S212, based on the determination result of step S210, the system control unit 50 determines whether or not a rotation angle in the yaw direction of the digital camera 100 is appropriate. In the present embodiment, a determination is made as to whether or not a rotation angle from the time of the first photography is around 180 degrees. When it is determined that the rotation angle is appropriate, the processing advances to step S220, but otherwise the processing advances to step S214.

In step S213, the orientation of the digital camera 100 is not an orientation that enables composition. In other words, the present state is state 2 (state 2'). Therefore, in step S213, the system control unit 50 performs processing for causing the light-emitting unit 21a to emit blinking red light as the processing of orientation guidance. Subsequently, the processing advances to step S215.

In step S214, the orientation of the digital camera 100 is an orientation that enables composition but the rotation angle in the yaw direction is not around 180 degrees. In other words, the present state is state 1 (state 1'). Therefore, in step S214, the system control unit 50 performs processing for causing the light-emitting unit 21a to emit solid red light as the processing of orientation guidance. Subsequently, the processing advances to step S215.

In step S215, the system control unit 50 determines whether or not a predetermined time T1 has elapsed from the first photography or, in other words, whether or not a timeout has occurred. While the predetermined time T1 is not particularly limited, in the present embodiment, the predetermined time T1 is set to 10 seconds. When it is determined that the predetermined time T1 has elapsed or, in other words, when it is determined that a timeout has occurred, the processing advances to step S216, but otherwise the processing advances to step S218.

In step S216, the system control unit 50 notifies the user of the fact that photography has failed. In the present embodiment, the user is notified of the fact that photography has failed by causing the light-emitting unit 21a to emit light such that the emission color of the light-emitting unit 21a alternately switches between green and red. It should be noted that methods of realizing various types of notifications are not particularly limited. For example, the user may be notified of the fact that photography has failed by display of the display unit 28. In step S217, the system control unit 50 initializes a state of photography (cancellation of the plurality of times of photography). Specifically, the system control unit 50 clears (deletes) the first fully celestial image being saved in the memory 32. Subsequently, the processing returns to step S201.

In step S218, the system control unit 50 determines whether or not a photography instruction (a full-press on the shutter button 61) has been issued. When it is determined that a photography instruction has been issued, the processing advances to step S219, but otherwise the processing returns to step S210. In step S219, the system control unit 50 notifies the user of the fact that photography cannot be performed. In the present embodiment, the user is notified of the fact that photography cannot be performed by causing the light-emitting unit 21a to emit blinking red light at a faster period than the blinking period that is used in orientation guidance. Subsequently, the processing returns to step S210.

In step S220, the orientation of the digital camera 100 is an orientation that enables composition and the rotation angle in the yaw direction is around 180 degrees. In other words, the present state is state 3 (state 3'). Therefore, in step S220, the system control unit 50 performs processing for causing the light-emitting unit 21a to emit solid green light as the processing of orientation guidance.

In step S221, the system control unit 50 determines whether or not a photography instruction (a full-press on the shutter button 61) has been issued. When it is determined that a photography instruction has been issued, the processing advances to step S223, but otherwise the processing advances to step S222. In step S222, the system control unit 50 determines whether or not a predetermined time T2 has elapsed from the realization of state 3 (state 3'). While the predetermined time T2 is not particularly limited, in the present embodiment, the predetermined time T2 is set to 3 seconds. When it is determined that the predetermined time T2 has elapsed, the processing advances to step S223, but otherwise the processing returns to step S210. In other words, even when a photography instruction is not issued, when the predetermined time T2 has elapsed from the realization of state 3 (state 3'), processing of step S223 (a second photography) is automatically performed.

In step S223, the system control unit 50 photographs a second fully celestial image. In step S224, the system control unit 50 determines whether or not the first fully celestial image being saved in the memory 32 and the second fully celestial image can be composited. When it is determined that composition can be performed, the processing advances to step S225, but otherwise the processing advances to step S227. In the present embodiment, the image processing unit 24 uses one of the two fully celestial images as a reference image and the other as a comparison image, and calculates an amount of deviation between the reference image and the comparison image for each area by pattern match processing. In addition, based on an amount of deviation for each area, the image processing unit 24 detects a connection position where an area of the reference image and an area of the comparison image are to be connected to each other. Subsequently, the image processing unit 24 generates a fully celestial image in which the photographer does not appear as a composite image by connecting the area of the reference image and the area of the comparison image to each other based on the detected connection position. In step S223, a determination of not compositable is made when, for example, a connection position cannot be detected.

In step S225, the system control unit 50 generates a fully celestial image in which the photographer does not appear as a composite image by compositing the first fully celestial image and the second fully celestial image with each other using the image processing unit 24. In step S226, the system control unit 50 saves (records) the composite image (the fully celestial image) generated in step S225 in the recording medium 200. Subsequently, the processing returns to step S201.

In step S227, the system control unit 50 notifies the user of the fact that composition cannot be performed. In the present embodiment, the notification of the fact that composition cannot be performed is the same as the notification of the fact that photography cannot be performed (step S219: blinking red light at a faster period). Alternatively, the notification of the fact that composition cannot be performed may differ from the notification of the fact that photography cannot be performed. In step S228, the system control unit 50 clears (deletes) the second fully celestial image. Subsequently, the processing returns to step S210.

As described above, in the present embodiment, images obtained by a plurality of times of photography are composited to generate a fully celestial image. During photography, a determination is made as to whether or not a state of a digital camera is an appropriate state that enables photography to be performed so that a photographer does not appear in a region to be used to generate the fully celestial image among an image obtained by each photography. By notifying the photographer whether or not the state is an appropriate state, the photographer can readily perform photography for generating a fully celestial image in which the photographer does not appear.

Second Embodiment

A second embodiment of the present invention will be described. Hereinafter, processing which differs from that in the first embodiment will be described in detail and processing which is the same as that in the first embodiment will be omitted as appropriate.

Figure 5A:
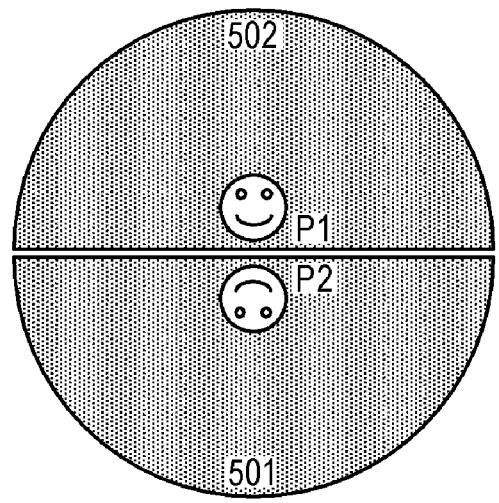
FIGS. 5A and 5B are diagrams showing circumstances (a method) of photography.
Figure 5B:
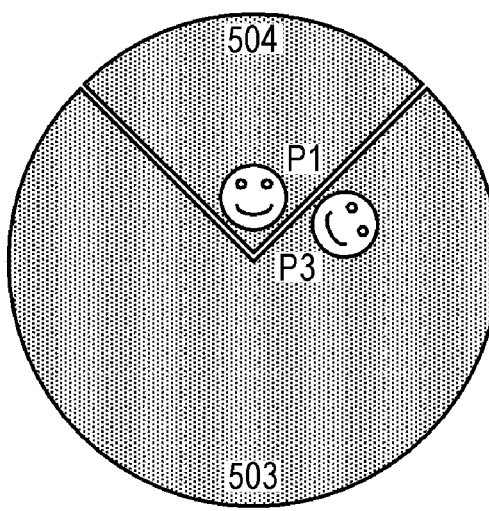

FIG. 5B shows an example of circumstances of photography according to the second embodiment. In the example shown in FIG. 5B, after photographing a first fully celestial image at a position P1, the photographer moves from the position P1 to a position P3. At this point, the photographer turns the digital camera 100 only in the yaw direction shown in FIG. 4. In this state, the photographer at the position P3 photographs a second fully celestial image.

In the first fully celestial image, while the photographer does not appear in a region (visual field range) 503, the photographer appears in a region (visual field range) 504. In the second fully celestial image, while the photographer does not appear in the region 504, the photographer appears in the region 503. The system control unit 50 performs at least processing for compositing the region 503 of the first fully celestial image and the region 504 of the second fully celestial image with each other, thereby generating a fully celestial image, in which the photographer does not appear, as a composite image.

In the first embodiment, a rotation angle of the digital camera 100 in the yaw direction (a movement amount of the photographer in the yaw direction) is set to around 180 degrees (FIG. 5A). However, even when the rotation angle is smaller than 180 degrees, the photographer can be prevented from appearing in a region in which the photographer appears in the first fully celestial image. Therefore, in FIG. 5B, the digital camera 100 is rotated in the yaw direction by a rotation angle (around 60 degrees) that is smaller than 180 degrees and the photographer moves accordingly. It should be noted that the rotation angle may be or may not be set in advance. For example, the system control unit 50 may detect a region where the photographer appears in the first fully celestial image and determine a necessary rotation angle based on the detection result. While an imaging unit to be used is not particularly limited, in the first embodiment, two images photographed by the imaging unit 22b are composited to generate a final fully celestial image. On the other hand, in the present embodiment, an image obtained by the imaging unit 22a in a first photography, an image obtained by the imaging unit 22b in the first photography, and an image obtained by the imaging unit 22a in a second photography are composited to generate a final fully celestial image.

Third Embodiment

Figure 3:
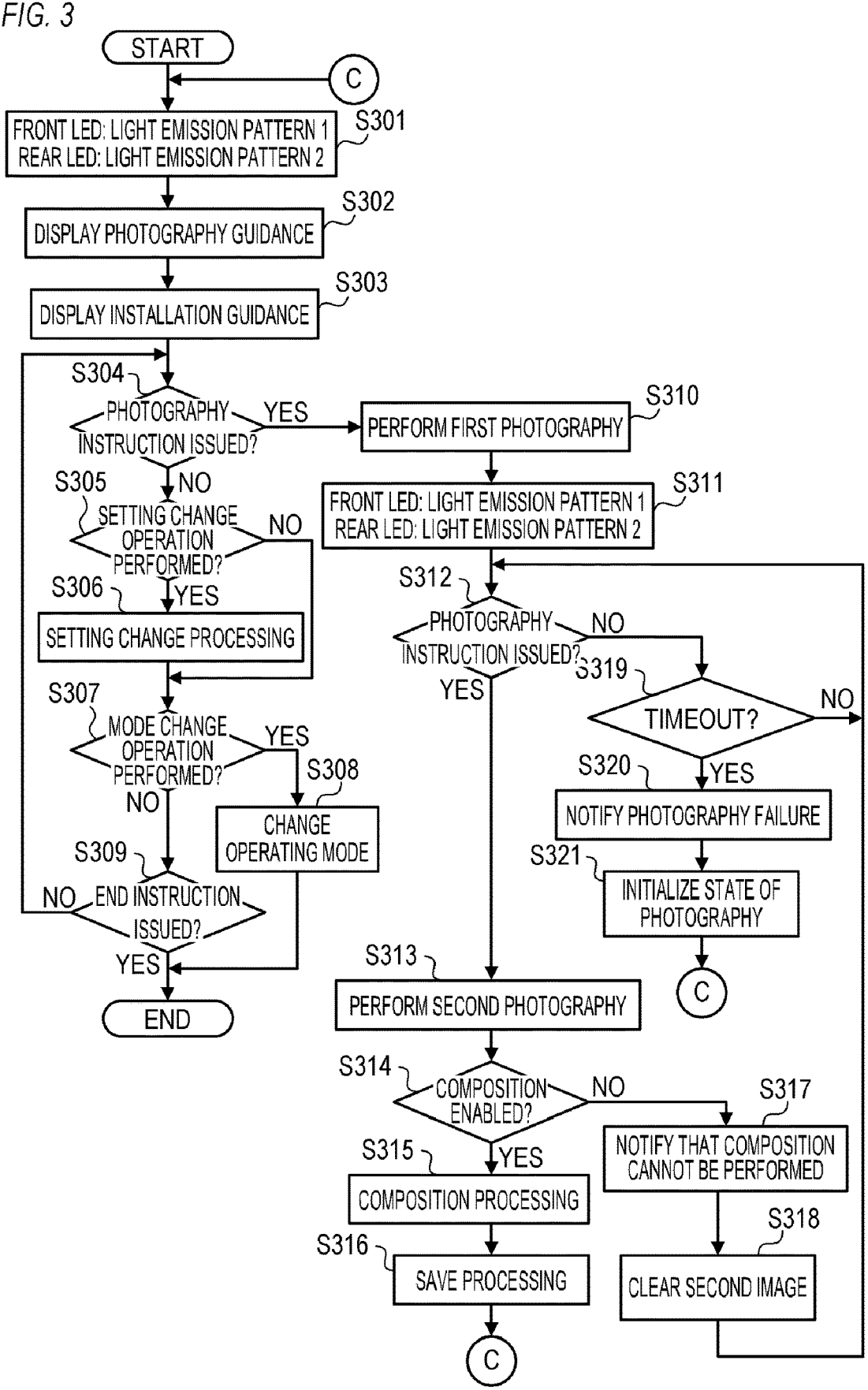
FIG. 3 is a flow chart of photographer removal mode 2.

A third embodiment of the present invention will be described. FIG. 3 is a flow chart according to the third embodiment and is a flow chart regarding photography processing of a fully celestial image performed by the digital camera 100. The processing is realized as the system control unit 50 deploys a program recorded in the nonvolatile memory 56 onto the system memory 52 and executes the program. The processing shown in FIG. 3 starts when power of the digital camera 100 is turned on and the photographer removal mode 2 is selected by an operation of the mode selecting switch 60. In the present embodiment, the digital camera 100 is operated by using a smartphone being wirelessly connected via the communicating unit 54 as a remote controller of the digital camera 100. Alternatively, the digital camera 100 may be directly operated.

In step S301, the system control unit 50 causes the light-emitting unit 21a (a front surface LED) to emit light in a predetermined light emission pattern 1 and causes the light-emitting unit 21b (a rear surface LED) to emit light in a predetermined light emission pattern 2 (which differs from the light emission pattern 1). While the light emission patterns 1 and 2 are not particularly limited, in the present embodiment, solid green light is adopted as the light emission pattern 1 and blinking green light is adopted as the light emission pattern 2.

In step S302, the system control unit 50 performs control using the communicating unit 54 so that photography guidance is displayed on a display surface of the smartphone being used as a remote controller. The photography guidance is guidance (a notification) for assisting photography and is, for example, a screen on which a message such as "Issue photography instruction at a position where light of a same pattern is visible" is described. When the digital camera 100 is directly operated, the photography guidance is displayed on the display unit 28.

In step S303, the system control unit 50 performs control using the communicating unit 54 so that installation guidance is displayed on the display surface of the smartphone. The installation guidance is guidance (a notification) for prompting the user to fix the digital camera 100 onto a tripod and is, for example, a screen on which a message such as "Install the digital camera on a tripod" is described. When the digital camera 100 is directly operated, the installation guidance is displayed on the display unit 28.

In step S304, the system control unit 50 determines whether or not the smartphone has been issued a photography instruction (a photographing operation) using the communicating unit 54. When the digital camera 100 is directly operated, the determination of step S304 is a determination of whether or not the shutter button 61 has been full-pressed. When it is determined that a photography instruction has been issued, the processing advances to step S310, but otherwise the processing advances to step S305. In step S305, the system control unit 50 determines whether or not a setting change operation has been performed. The setting change operation may be performed with respect to the smartphone or performed with respect to the digital camera 100. When it is determined that a setting change operation has been performed, the processing advances to step S306, but otherwise the processing advances to step S307. In step S306, the system control unit 50 changes settings by reflecting a setting in accordance with the setting change operation onto the system memory 52 (setting change processing). In step S307, the system control unit 50 determines whether or not a mode change operation has been performed. The mode change operation may be performed with respect to the smartphone or performed with respect to the digital camera 100. When it is determined that a mode change operation has been performed, the processing advances to step S308, but otherwise the processing advances to step S309. In step S308, the system control unit 50 changes operating modes from photographer removal mode 2 to another operating mode in accordance with the mode change operation. Subsequently, the processing shown in FIG. 3 is ended. In step S309, the system control unit 50 determines whether or not an end operation such as depressing the power supply switch 72 has been performed. When it is determined that an end operation has been performed, the processing shown in FIG. 3 is ended, but otherwise the processing returns to step S304.

When it is determined in step S304 that a photography instruction has been issued, in step S310, the system control unit 50 photographs a first fully celestial image and saves (records) the fully celestial image in the memory 32.

In step S311, the system control unit 50 interchanges the light emission pattern of the light-emitting unit 21a and the light emission pattern of the light-emitting unit 21b. In other words, the system control unit 50 switches the light emission pattern of the light-emitting unit 21a from light emission pattern 1 to light emission pattern 2 and switches the light emission pattern of the light-emitting unit 21b from light emission pattern 2 to light emission pattern 1. Due to the interchange of light emission patterns, the photographer moves to a rear surface side of the digital camera 100 based on the photography guidance of "Issue photography instruction at a position where light of a same pattern is visible".

In step S312, the system control unit 50 determines whether or not a photography instruction has been issued. When it is determined that a photography instruction has been issued, the processing advances to step S313, but otherwise the processing advances to step S319.

In step S319, the system control unit 50 determines whether or not the predetermined time T1 has elapsed from the first photography or, in other words, whether or not a timeout has occurred. In the present embodiment, the predetermined time T1 is set to 10 seconds. When it is determined that the predetermined time T1 has elapsed or, in other words, when it is determined that a timeout has occurred, the processing advances to step S320, but otherwise the processing returns to step S312.

In step S320, the system control unit 50 notifies the user of the fact that photography has failed. For example, the user is notified of the fact that photography has failed by causing each of the light-emitting units 21a and 21b to emit light such that the emission color of the light-emitting unit 21a or 21b alternately switches between green and red. Alternatively, the user is notified of the fact that photography has failed by displaying a predetermined screen on the display surface of the smartphone. The user may be notified of the fact that photography has failed by displaying a predetermined screen on the display unit 28. In step S321, the system control unit 50 initializes a state of photography (cancellation of the plurality of times of photography). Specifically, the system control unit 50 clears (deletes) the first fully celestial image being saved in the memory 32. Subsequently, the processing returns to step S301.

When it is determined in step S312 that a photography instruction has been issued, in step S313, the system control unit 50 photographs a second fully celestial image. In step S314, the system control unit 50 determines whether or not the first fully celestial image being saved in the memory 32 and the second fully celestial image can be composited. When it is determined that composition can be performed, the processing advances to step S315, but otherwise the processing advances to step S317.

In step S315, the system control unit 50 generates a fully celestial image in which the photographer does not appear as a composite image by compositing the first fully celestial image and the second fully celestial image with each other using the image processing unit 24. Specifically, a first visual field range in the first fully celestial image and a second visual field range in the second fully celestial image are composited. In this case, for example, the first visual field range is the visual field range 501 shown in FIG. 5A and the second visual field range is the visual field range 502 shown in FIG. 5B. In step S316, the system control unit 50 saves (records) the composite image (the fully celestial image) generated in step S315 in the recording medium 200. Subsequently, the processing returns to step S301.

In step S317, the system control unit 50 notifies the user of the fact that composition cannot be performed. For example, the user is notified of the fact that composition cannot be performed by causing each of the light-emitting units 21a and 21b to emit blinking red light. Alternatively, the user is notified of the fact that composition cannot be performed by displaying a predetermined screen on the display surface of the smartphone. The user may be notified of the fact that composition cannot be performed by displaying a predetermined screen on the display unit 28. In step S318, the system control unit 50 clears (deletes) the second fully celestial image. Subsequently, the processing returns to step S312.

As described above, according to the respective embodiments, a wide-range image in which a specific object such as a photographer does not appear and which is free of any sense of discomfort can be photographed.

It should be noted that the various controls described above as controls to be performed by the system control unit 50 may be carried out by one piece of hardware or a plurality of pieces of hardware (for example, a plurality of processors or circuits) may control an entire apparatus by sharing processing.

In addition, while the present invention has been described in detail on the basis of preferred embodiments thereof, it is to be understood that the present invention is not limited to the specific embodiments and that various modes that do not constitute departures from the scope of the invention are also included in the present invention. Furthermore, the embodiments described above simply represent examples of the present invention and the embodiments can also be combined with other embodiments.

Furthermore, while an example in which the present invention is applied to a digital camera has been described in the embodiments presented above, the present invention is not limited to this example and can be applied to any electronic device capable of photographing a VR image. Obviously, the present invention can also be applied to a smartphone instead of a digital camera.

According to the present disclosure, a wide-range image in which a specific object such as a photographer does not appear and which is free of any sense of discomfort can be photographed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus, which captures a first captured image and a second captured image for generating a 360-degree image by combining (a) a first image corresponding to a first field of view acquired from the first captured image and (b) a second image corresponding to a second field of view, which is different from the first field of view, acquired from the second captured image, the imaging apparatus comprising:
   a processor; and
   a memory storing a program which, when executed by the processor, causes the imaging apparatus to:
   (1) perform control to capture the first captured image,
   (2) perform control to provide a predetermined notification for requesting a user to move from the second field of view to the first field of view, after capturing the first captured image, and
   (3) perform control to capture the second captured image after performing the predetermined notification.

2. The imaging apparatus according to claim 1, wherein the first field of view and the second field of view differ by 180 degrees in a yaw direction.

3. The imaging apparatus according to claim 1, wherein each of the first field of view and the second field of view corresponds to a horizontal angle of 180 degrees and a vertical angle of 180 degrees.

4. The imaging apparatus according to claim 1, wherein the 360-degree image has a field of view of which a horizontal angle is 360 degrees.

5. The imaging apparatus according to claim 1, wherein the 360-degree image has a field of view of which a vertical angle is 360 degrees.

6. The imaging apparatus according to claim 1, wherein an instruction for capturing the first captured image is performed by the user.

7. The imaging apparatus according to claim 1, wherein the capturing of the second captured image is performed within a predetermined time after the capturing of the first captured image.

8. The imaging apparatus according to claim 1, wherein the predetermined notification is performed by causing a light-emitting member to emit light in accordance with at least one of a predetermined light emission pattern and a predetermined light emission color.

9. The imaging apparatus according to claim 1, wherein the predetermined notification is performed by causing a display to display a predetermined message.

10. The imaging apparatus according to claim 1, wherein the program, when executed by the processor, further causes the imaging apparatus to generate the 360-degree image by combining the first image and the second image.

11. The imaging apparatus according to claim 10, wherein in the generating of the 360-degree image, distortion correction is performed.

12. The imaging apparatus according to claim 10, wherein in the generating of the 360-degree image, the 360-degree image is generated using equirectangular projection.

13. The imaging apparatus according to claim 1, wherein the program, when executed by the processor, further causes the imaging apparatus to perform control to provide another notification for prompting the imaging apparatus to be fixed, before the capturing of the first captured image is performed.

14. The imaging apparatus according to claim 1, wherein in a case where a predetermined mode is selected by the user, the control to capture the first captured image, the control to provide the predetermined notification, and the control to capture the second captured image are performed.

15. The imaging apparatus according to claim 1, wherein the program, when executed by the processor, further causes the imaging apparatus to perform control to communicate with an external apparatus, and
   wherein the capturing of the first captured image is performed in response to an instruction from the external apparatus.

16. The imaging apparatus according to claim 1, wherein the first field of view is one of a front range of the imaging apparatus and a rear range of the imaging apparatus, and
   wherein the second field of view is another of the front range of the imaging apparatus and the rear range of the imaging apparatus.

17. The imaging apparatus according to claim 1, wherein the first captured image and the second captured image are captured by using a first camera and a second camera which captures in a direction different from the first camera, respectively.

18. The imaging apparatus according to claim 1, further comprising:
   a first camera which performs capturing toward the first field of view; and
   a second camera which performs capturing toward the second field of view.

19. A control method of an imaging apparatus, wherein the imaging apparatus captures a first captured image and a second captured image for generating a 360-degree image by combining (a) a first image corresponding to a first field of view acquired from the first captured image and (b) a second image corresponding to a second field of view, which is different from the first field of view, acquired from the second captured image, the control method comprising:
   performing control to capture the first captured image;
   performing control to provide a predetermined notification for requesting a user to move from the second field of view to the first field of view, after capturing the first captured image; and
   performing control to capture the second captured image after performing the predetermined notification.

20. A non-transitory computer-readable medium that stores a program, wherein the program causes a computer to execute a control method of an imaging apparatus, wherein the imaging apparatus captures a first captured image and a second captured image for generating a 360-degree image by combining (a) a first image corresponding to a first field of view acquired from the first captured image and (b) a second image corresponding to a second field of view, which is different from the first field of view, acquired from the second captured image, the control method comprising:
   performing control to capture the first captured image;
   performing control to provide a predetermined notification for requesting a user to move from the second field of view to the first field of view, after capturing the first captured image; and
   performing control to capture the second captured image after performing the predetermined notification.

21. The non-transitory computer-readable medium according to claim 20, wherein the first field of view and the second field of view differ by 180 degrees in a yaw direction.

22. The non-transitory computer-readable medium according to claim 20, wherein each of the first field of view and the second field of view corresponds to a horizontal angle of 180 degrees and a vertical angle of 180 degrees.

23. The non-transitory computer-readable medium according to claim 20, wherein the 360-degree image has a field of view of which a horizontal angle is 360 degrees.

24. The non-transitory computer-readable medium according to claim 20, wherein the 360-degree image has a field of view of which a vertical angle is 360 degrees.

25. The non-transitory computer-readable medium according to claim 20, wherein an instruction for capturing the first captured image is performed by the user.

26. The non-transitory computer-readable medium according to claim 20, wherein the capturing of the second captured image is performed within a predetermined time after the capturing of the first captured image.

27. The non-transitory computer-readable medium according to claim 20, wherein the predetermined notification is performed by causing a light-emitting member to emit light in accordance with at least one of a predetermined light emission pattern and a predetermined light emission color.

28. The non-transitory computer-readable medium according to claim 20, wherein the predetermined notification is performed by causing a display to display a predetermined message.

29. The non-transitory computer-readable medium according to claim 20, wherein the control method further comprises generating the 360-degree image by combining the first image and the second image.

30. The non-transitory computer-readable medium according to claim 29, wherein in the generating of the 360-degree image, distortion correction is performed.

31. The non-transitory computer-readable medium according to claim 29, wherein in the generating of the 360-degree image, the 360-degree image is generated using equirectangular projection.

32. The non-transitory computer-readable medium according to claim 20, wherein the control method further comprises performing control to provide another notification for prompting the imaging apparatus to be fixed, before the capturing of the first captured image is performed.

33. The non-transitory computer-readable medium according to claim 20, wherein in a case where a predetermined mode is selected by the user, the control to capture the first captured image, the control to provide the predetermined notification, and the control to capture the second captured image are performed.

34. The non-transitory computer-readable medium according to claim 20, wherein the control method further comprises performing control to communicate with an external apparatus, and wherein the capturing of the first captured image is performed in response to an instruction from the external apparatus.

35. The non-transitory computer-readable medium according to claim 20, wherein the first field of view is one of a front range of the imaging apparatus and a rear range of the imaging apparatus, and
wherein the second field of view is another of the front range of the imaging apparatus and the rear range of the imaging apparatus.

36. The non-transitory computer-readable medium according to claim 20, wherein the first captured image and the second captured image are captured by using a first camera and a second camera which captures in a direction different from the first camera, respectively.

* * * * *